United States Patent Office 3,423,449
Patented Jan. 21, 1969

3,423,449
PROCESS FOR PREPARING ALIPHATIC POLYISOCYANATES
Emmett H. Burk, Jr., Glenwood, Ill., and Donald D. Carlos, Crown Point, Ind., assignors to Sinclair Research, Inc., New York, N.Y., a corporation of Delaware
No Drawing. Filed Oct. 22, 1965, Ser. No. 502,382
U.S. Cl. 260—453                    9 Claims
Int. Cl. C07c 119/04; C07d 95/00

ABSTRACT OF THE DISCLOSURE

Aliphatic polyisocyanates are prepared by subjecting to thermal decomposition a cyclic nitrile sulfite which is free of chlorine-containing impurities and which has the structure:

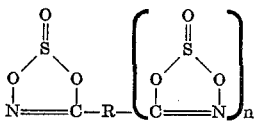

wherein R is an aliphatic (including cycloaliphatic) hydrocarbon of 1 to about 50, preferably 1 to about 30, carbon atoms and $n$ is an integer of 1 to 3, preferably 1.

---

The present invention is directed to a process for the production of aliphatic polyisocyanates including aliphatic diisocyanates. More specifically, the invention is directed to the production of polyisocyanates by the thermal decomposition of essentially chlorine-free aliphatic poly(nitrile sulfites) including aliphatic di(nitrile sulfites).

Polyisocyanates such as diisocyanates have found extensive use in the preparation of high molecular weight polymers by reaction of the polyisocyanates with polymerizable organic compounds such as compounds with terminals, active hydroxy and amine groups. Polyurethanes, for instance, are commonly prepared by the reaction of diisocyanates and polyhydroxy alcohols such as the glycols.

The aliphatic poly(nitrile sulfites) which decompose to the corresponding aliphatic polyisocyanates in accordance with the process of the present invention, can be represented by the following structure:

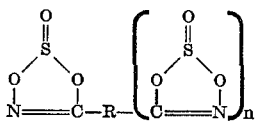

wherein R is an aliphatic (including cycloaliphatic) hydrocarbon of 1 to about 50 carbon atoms, preferably about 1 to 30 carbon atoms, and $n$ is an integer of 1 to 3, preferably 1. The aliphatic hydrocarbon, R, can be saturated or unsaturated, straight or branched chain and can be substituted with non-interfering groups as, for instance, with aromatic substituents. Preferably, the hydrocarbon R is alkyl (including cycloalkyl) or monoolefinic. The nitrile sulfite groups may be attached to the same or different carbon atoms of the hydrocarbon R, but preferably R contains a nitrile sulfite group on each end of the chain.

Aliphatic poly(nitrile sulfites) that can be used as the feed in the method of the present invention can be prepared for instance by the method described in copending application Ser. No. 502,327 to Emmett H. Burk and Donald D. Carlos filed concurrently herewith and now abandoned. Illustrative of suitable feeds are malodi(nitrile sulfite), succinodi(nitrile sulfite), pimelodi(nitrile sulfite), suberodi(nitrile sulfite), azelodi(nitrile sulfite), sebacodi(nitrile sulfite), fumarodi(nitrile sulfite), itacodi(nitrile sulfite), allylmalodi(nitrile sulfite), allylsuccinodi(nitrile sulfite), xerodi(nitrile sulfite), cetylmalodi(nitrile sulfite); 1,6,9-decanetri(nitrile sulfite); 1,3,6-heptanetri(nitrile sulfite); 4-bromo-1,6-hexanedi(nitrile sulfite); 2-chloro-1,9-nonanedi(nitrile sulfite) and cyclohexyldi(nitrile sulfite).

Decomposition of the aliphatic poly(nitrile sulfite) to the corresponding aliphatic polyisocyanate can be effected by heating the aliphatic poly(nitrile sulfite) to a temperature below the degradation point of the desired aliphatic polyisocyanate product. Since the decomposition reaction is exothermic there may be a tendency for the reaction temperature to run away. Means for carrying away or absorbing heat may be used, therefore, to control the temperature below the degradation point of the desired aliphatic polyisocyanate product. The temperature employed will vary, of course, depending upon the decomposition temperature of the feed and degradation temperature of the particular aliphatic polyisocyanates being prepared. In most cases, however, temperatures will usually fall in the range of about 50 to 200° C., preferably about 75 to 150° C. Advantageously, the decomposition is conducted in the presence of an inert solvent such as benzene, xylenes, toluene, chlorobenzene and the like or in excess thionyl chloride.

The ability of the aliphatic poly(nitrile sulfites) to generate polyisocyanates upon heating provides an additional advantage to the consumer in that the aliphatic poly(nitrile sulfites), in contrast to isocyanates, are stable in the absence of water and therefore can be easily handled and stored. Also, since there is no active hydrogen (e.g., in the form of HCl), present in the aliphatic poly(nitrile sulfites) or in the decomposition products formed, to react with the isocyanate when the latter is made, use of the aliphatic poly(nitrile sulfites) for the production of polyisocyanates provides a method that does not suffer from the reduced yields and separation and purification problems presented by the by-products obtained from starting materials of commercial methods wherein active hydrogen is present. Use of the aliphatic poly(nitrile sulfites) in the preparation of isocyanates, furthermore, provides a process having advantages over commercial methods employing azides in that the former do not have the explosion tendencies of the latter and are more economical.

The aliphatic poly(nitrile sulfites) can be prepared by reacting an aliphatic polyhydroxamic acid and thionyl chloride. Aliphatic polyhydroxamic acids which react with thionyl chloride to produce the aliphatic poly(nitrile sulfites) compound of the invention can be represented by the structure:

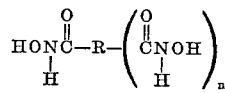

wherein R and $n$ are as defined above in the structure of the aliphatic poly(nitrile sulfite).

Illustrative of aliphatic polyhydroxamic acids suitable for use as the reactant in the preparation of the aliphatic poly(nitrile sulfites) are the following: malodihydroxamic acid, succinodihydroxamic acid, glutarodihydroxamic acid, adipodihydroxamic acid, pimelodihydroxamic acid, suberodihydroxamic acid, azelodihydroxamic acid, sebacodihydroxamic acid, fumarodihydroxamic acid, itacodihydroxamic acid, allylmalodihydroxamic acid, cetylmalodihydroxamic acid; 1,6,9-decanetrihydroxamic acid; 1,3,6-heptanetrihydroxamic acid, cyclohexyldihydroxamic acid, 4-bromo-1,6-hexanedihydroxamic acid; 2-chloro-1,9-nonanedihydroxamic acid; etc.

The temperature for effecting the reaction of the aliphatic hydroxamic acid and thionyl chloride may vary depending upon the particular aliphatic hydroxamic acid selected but in all cases should be conducted below the decomposition temperature of the desired aliphatic nitrile sulfite. Reflux temperatures can also be used as long as the reflux temperature of the particular mixture is below the decomposition temperature of the corresponding aliphatic nitrile sulfite produced. The reaction temperature will often fall in the range of up to about 90° C., often up to about 40° C. to 70° C., preferably up to about 30° C. The reaction can be run at temperatures as low as about minus 30° C. Ordinarily the reaction will proceed readily at atmospheric pressure but sub- and superatmospheric pressure can be employed if desired.

Either the polyhydroxamic acid reactant or the thionyl chloride reactant can be in excess but it is preferred that at least a stoichiometric amount of thionyl chloride be used, that is, a ratio of at least one mole of thionyl chloride per hydroxamic acid substituent. A large excess of thionyl chloride is particularly preferred. The reaction can be conducted in the liquid phase and in many cases the aliphatic poly(hydroxamic acid) will react from the solid state. Advantageously the aliphatic poly(hydroxamic acid) is first dissolved or slurried in an oxygen-containing organic solvent. Illustrative of suitable oxygen-containing solvents are the thionyl chloride reactant itself and normally liquid organic ethers, esters, furans, dioxanes and the like. The preferred solvent is thionyl chloride reactant, an excess of which will partially dissolve the aliphatic poly(hydroxamic acid).

The reaction is often over in less than about 0.5 hour, for example, 15 minutes or in about 5 to 20 hours, depending upon the reaction temperature employed and is marked by a cessation in hydrogen chloride gas evolution. Normally at least about 0.5 hour is required for the reaction to go to completion at temperatures which minimize side reactions. The reaction is usually quite rapid as the aliphatic poly(hydroxamic acid) is dissolved. At the lower reaction temperatures the aliphatic poly(hydroxamic acid) is generally slow to dissolve and may even come out of solution, go back into solution, etc., during the reaction.

The aliphatic nitrile sulfite can be recovered from the resulting solution by any desirable means, for instance, by first filtering the resulting solution to remove any unreacted starting materials and subjecting the filtrate to reduced pressure to remove unreacted thionyl chloride and inert solvent, if employed, and provide the aliphatic nitrile sulfite as a crude product. Alternatively, prior to the filtering step, the solution can be cooled to crystallize out the product which is then recovered as described. The crude product, which can be either crystalline or liquid depending on the particular aliphatic poly(nitrile sulfite) prepared, contains small amounts of impurities high in chlorine content. The feed decomposed in accordance with the present invention, that is, essentially chlorine-free aliphatic poly(nitrile sulfite), can be obtained by recrystallization techniques as, for instance, from a suitable solvent such as dichloromethane, carbon disulfide, ethyl acetate, thionyl chloride and the like or mixtures thereof.

A convenient alternative method for obtaining an essentially chlorine-free aliphatic poly(nitrile sulfite) is by extraction or washing with a hydrocarbon solvent. Any normally liquid hydrocarbon solvent can be used for the extraction as, for instance, alkanes of 5 to 15 or more carbon atoms, aromatic solvents such as benzene, xylenes, toluene, chlorobenzene and the like. A minimum amount of solvent is employed in the extraction, the actual amount used being dependent upon the particular aliphatic poly(nitrile sulfite) feed selected. If desired, a combination of both the recrystallization and extraction methods can be used to obtain essentially chlorine-free aliphatic poly(nitrile sulfite). Thermal decomposition of the essentially chlorine-free feed in accordance with the method of the present invention results in improved yields of a purer polyisocyanate product, which is also essentially chlorine-free.

The following examples are included to further illustrate the present invention.

Example I

To a 300 cc. fluted, round bottom flask equipped with a reflux condenser attached to a $CaCl_2$ drying tube, were added 4.2 g. (0.029 mole) of fumarodihydroxamic acid and 248 g. (2.08 moles) of thionyl chloride. The reaction mixture was stirred mechanically and heated to reflux for half an hour. The resulting solution was filtered and the thionyl chloride removed under reduced pressure. There resulted a quantitative yield of crude fumarodi(nitrile sulfite) containing a small amount of impurities (M.P. 149–150° C. dec.). Recrystallization from benzene gave chlorine-free white needles, M.P. 150° C. dec.

To a 500 cc. round bottom flask equipped with a reflux condenser attached to a $CaCl_2$ drying tube, were added 12 g. (0.050 mole) of the thus prepared fumarodi(nitrile sulfite) and 200 cc. of o-dichlorobenzene. The reaction mixture was stirred mechanically and heated to reflux for two hours. The resulting solution was fractionally distilled to give 4.5 g. (82%) of chlorine-free trans-vinylenediisocyanate, B.P. 152–155° C. at 745 mm. of Hg pressure.

Example II

To a 500 cc. fluted, round bottom flask equipped with a reflux condenser attached to a $CaCl_2$ drying tube, were added 23.8 g. (0.14 mole) of adipodihydroxamic acid and 495 g. (4.16 moles) of thionyl chloride. The reaction mixture was stirred mechanically and heated to a maximum temperature of 55° C. for two hours. The resulting solution was filtered and the thionyl chloride removed under reduced pressure. There resulted a quantitative yield of crude adipodi(nitrile sulfite) which upon recrystallization from pentane gave chlorine-free white crystals, M.P. 45° C.

The infrared spectrum (Nujol mull) of the recrystallized material showed a significant band at 6.19 microns, characteristic of a C=N stretching vibration and significant absorption in the 8.13 micron region characteristic of cyclic sulfites.

Decomposition of the white crystals of adipodi(nitrile sulfite) in accordance with the procedure and apparatus of Example I provides chlorine-free butamethylene diisocyanate.

Example III

To a 500 cc. fluted, round bottom flask equipped with a reflux condenser attached to a $CaCl_2$ drying tube, were added 28.0 g. (0.121 mole) of sebacodihydroxamic acid and 495 g. (4.16 moles) of thionyl chloride. The reaction mixture was stirred mechanically and maintained at a maximum temperature of 25° C. for two hours. The reaction mixture was filtered to give 5.9 g. of starting material. The thionyl chloride was removed under reduced pressure from the filtrate to give a quantitative yield of crude sulfite based on reacted starting material. The crude sebacodi(nitrile sulfite), M.P. 47–49° C., was recrystallized from pentane to give essentially chlorine-free white crystals, M.P. 48–50° C.

*Analysis.*—Calc. for $C_{10}H_{16}N_2O_6S_2$: C, 37.05; H, 4.94; N, 8.65; S, 19.75. Found: C, 37.89; H, 5.50; N, 7.29.

The infrared spectrum (Nujol mull) of the recrystallized material showed a significant band at 6.19 microns, characteristic of a C=N stretching vibration and significant absorption in the 8.15 micron region characteristic of cyclic sulfites.

The sebacodi(nitrile sulfite) is decomposed to chlorine-free sebacodiisocyanate (i.e., octamethylene diisocyanate) employing the same procedure and apparatus of Example I.

It is claimed:
1. A process for the production of aliphatic polyisocyanates which consists essentially of subjecting to thermal decomposition, at a temperature below the degradation point of the desired isocyanate, an aliphatic poly(nitrile sulfite) compound which is essentially free of chlorine-containing impurities and which has the structure:

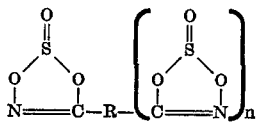

wherein R is aliphatic hydrocarbon of 1 to about 50 carbon atoms and $n$ is an integer of 1 to 3.

2. The process of claim 1 wherein R contains 1 to about 30 carbon atoms and $n$ is 1.
3. The process of claim 1 wherein R is saturated or mono-olefinically unsaturated aliphatic hydrocarbon and $n$ is 1 or 2.
4. The process of claim 1 wherein the aliphatic poly(nitrile sulfite) compound subjected to the decomposition is fumarodi(nitrile sulfite) and the aliphatic polyisocyanate produced thereby is trans-vinylene diisocyanate.
5. The process of claim 1 wherein the aliphatic poly(nitrile sulfiate) compound subjected to the decomposition is adipodi(nitrile sulfite) and the aliphatic polyisocyanate produced thereby is butamethylene diisocyanate.
6. The process of claim 1 wherein the aliphatic poly(nitrile sulfite) compound subjected to the decomposition is sebacodi(nitrile sulfite) and the aliphatic polyisocyanate produced thereby is octamethylene diisocyanate.
7. A process for the preparation of aliphatic polyisocyanates which consists essentially of reacting thionyl chloride and an aliphatic polyhydroxamic acid having the structure:

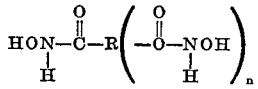

wherein R is aliphatic hydrocarbon of 1 to about 50 carbon atoms and $n$ is an integer of 1 to 3, separating from the resulting reaction product mixture an aliphatic poly(nitrile sulfite) which is essentially free of chlorine-containing impurities and which has the structure:

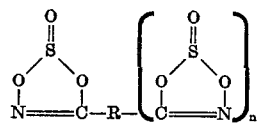

wherein R and $n$ correspond to that of said aliphatic polyhydroxamic acid and subjecting said aliphatic poly(nitrile sulfite) to thermal decomposition, at a temperature below the degradation point of the desired isocyanate, to provide the corresponding aliphatic polyisocyanate.

8. The process of claim 7 wherein R is saturated or mono-olefinically unsaturated aliphatic hydrocarbon and $n$ is 1 or 2.
9. The process of claim 7 wherein R contains 1 to about 30 carbon atoms and $n$ is 1.

References Cited

UNITED STATES PATENTS

| 2,394,597 | 2/1946 | Dickey et al. | 260—453 |
| 3,238,220 | 3/1966 | Boshagen | 260—301 XR |
| 3,268,542 | 8/1966 | Burk et al. | 260—453 XR |

OTHER REFERENCES

Marquis: Compt. Rend. 143, pp. 1163–5 (1960).

CHARLES B. PARKER, *Primary Examiner.*

DOLPH H. TORRENCE, *Assistant Examiner.*

U.S. Cl. X.R.

260—301